United States Patent
Paulonis et al.

[15] 3,678,570
[45] July 25, 1972

[54] DIFFUSION BONDING UTILIZING TRANSIENT LIQUID PHASE

[72] Inventors: Daniel F. Paulonis, Killingworth; David Scott Duvall, Middletown; William A. Owczarski, Cheshire, all of Conn.

[73] Assignee: United Aircraft Corporation, East Hartford, Conn.

[22] Filed: April 1, 1971

[21] Appl. No.: 130,149

[52] U.S. Cl. .................................................29/498, 29/504
[51] Int. Cl. ...................................B23k 31/02, B23k 35/24
[58] Field of Search .........................................29/498, 504

[56] References Cited

UNITED STATES PATENTS

| | | | |
|---|---|---|---|
| 2,957,239 | 10/1960 | Pritchard | 29/498 X |
| 3,024,109 | 3/1962 | Hoppin et al. | 29/498 X |
| 3,088,192 | 5/1963 | Turner | 29/504 X |
| 3,145,466 | 8/1964 | Feduska | 29/504 X |
| 3,188,732 | 6/1965 | Feduska et al. | 29/504 X |
| 3,197,858 | 8/1965 | Feduska et al. | 29/504 X |
| 3,530,568 | 9/1970 | Owczarski et al. | 29/498 |
| 3,552,898 | 1/1971 | Bird et al. | 29/498 |

OTHER PUBLICATIONS

Kaarlela et al., " Alloy Effects in the Low-Pressure Diffusion Bonding of Superalloys," Welding Journal, June, 1967, pp. 283-s to 288-s.

Kinelski et al., " New Developments in Brazing High-Temperature Nickel-Base Alloys," Welding Journal, Dec., 1959, pp. 482-s to 486-s.

Primary Examiner—John F. Campbell
Assistant Examiner—Ronald J. Shore
Attorney—Richard N. James

[57] ABSTRACT

Diffusion bonding is effected utilizing a thin alloy interlayer which melts at the desired diffusion bonding temperature forming a transient liquid phase and which subsequently resolidifies at temperature as a result of constituent interdiffusion, continued heat treatment providing a homogeneous solid-state diffusion bond.

1 Claim, 7 Drawing Figures

ASSEMBLY READY FOR BONDING

PATENTED JUL 25 1972 3,678,570

ASSEMBLY READY FOR BONDING

HEATED TO BONDING TEMP. INTERLAYER MELTS

AT BONDING TEMP. DIFFUSION CAUSES JOINT TO ISOTHERMALLY SOLIDIFY

COMPLETION OF SOLIDIFICATION AT TEMP. HOMOGENIZATION CONTINUES

BONDED ASSEMBLY WITH COMPLETED HOMOGENIZATION

INVENTORS
DANIEL F. PAULONIS
DAVID S. DUVALL
WILLIAM A. OWCZARSKI

Richard N. James
BY                  ATTORNEY

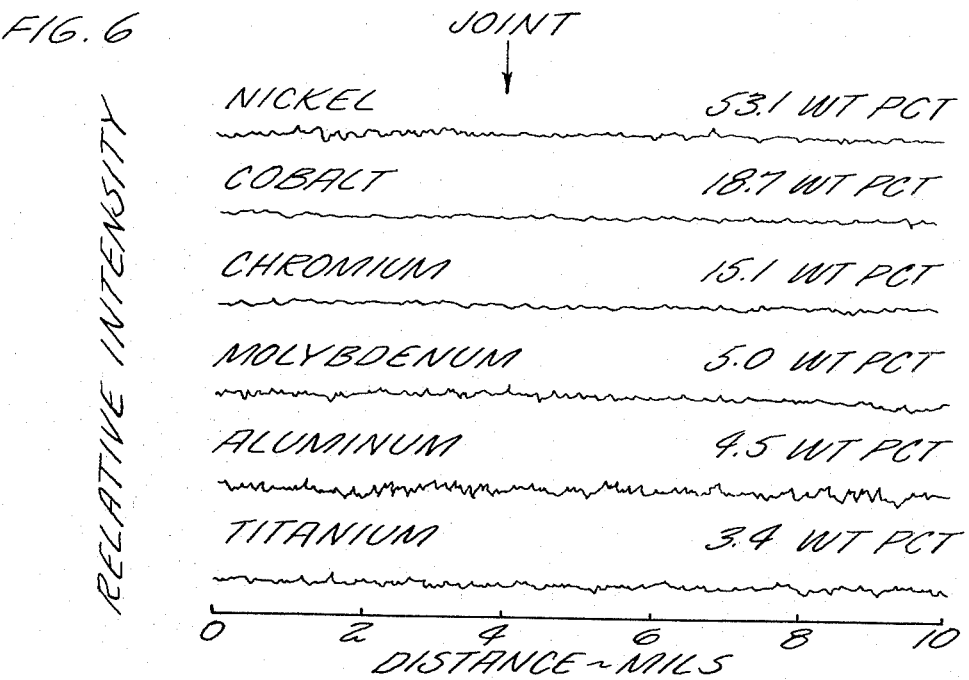
ILLUSTRATION OF ELECTRON-PROBE MICROANALYSIS TRACES ACROSS REPRESENTATIVE JOINT
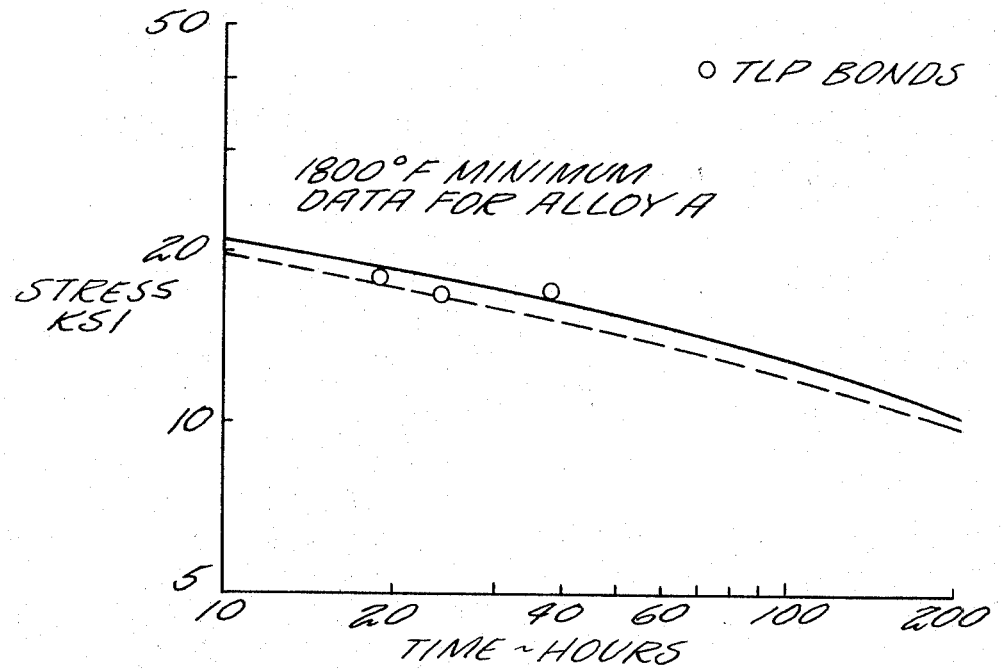
1800°F STRESS-RUPTURE RESULTS OBTAINED FOR TLP BONDED ALLOY A. DASHED LINE INDICATES 95% JOINT-EFFICIENCY LEVEL WITH RESPECT TO BASE-METAL MINIMUM DATA.

DIFFUSION BONDING UTILIZING TRANSIENT LIQUID PHASE

BACKGROUND OF THE INVENTION

The present invention relates in general to the art of diffusion bonding, particularly as applied to the superalloys.

It is frequently desirable to make certain gas turbine engine components by joining easily fabricable segments together into the desired configurations. However, the limited weldability of the high strength superalloys has severely restricted the application of fusion welding techniques on structural turbine hardware. Further, many components because of configuration are simply not adapted to fusion welding techniques. Brazing, while offering a number of advantages over fusion welding, has very limited application because of the penalties associated with the relatively low strengths and low melting points associated with the typical brazed joints.

Diffusion bonding, which involves the solid-state movement of the atoms and grain growth across a joint interface, offers particular promise as the joining technique for the highly alloyed superalloys. It has been demonstrated, for example, that complex assemblies may be fabricated from the superalloys by diffusion bonding with the provision of bonded areas which are practically indistinguishable from the adjacent parent metal even on close metallurgical examination. In this regard, reference may be made to the patent to Owczarski et al., U.S. Pat. No. 3,530,568.

Since diffusion bonding basically depends upon solid-state transport phenomena, it necessarily follows that carefully prepared and matched surfaces are mandatory for the achievement of satisfactory joints. This in turn makes the typical diffusion bonding fabrication process both sensitive to precise process control and expensive. Furthermore, even with precise control of the process parameters, certain desirable interface geometries are quite difficult to bond if pressure is not applied uniformly throughout the entire interface area, and interfacial defects often result if insufficient localized deformation cannot be effected over the entire interface area. The problem is, of course, principally related to the necessity for sufficient surface-to-surface contact for the solid-state transport phenomena to occur uniformly across the joint.

Brazing operations in general are not as sensitive to a surface match as is diffusion bonding, inasmuch as the flow of the molten braze material tends to fill any gaps existing between the surfaces. Furthermore, it is well recognized that in all types of brazing a necessary measure of interalloying takes place between the braze material and the base metal substrate.

In a brazed joint, the efficiency is dependent not only upon the effectiveness of the braze/substrate bond but also upon the composition of the braze material itself upon completion of the brazing cycle. Some brazing operations permit sufficient interalloying of the braze material with the substrate to an extent providing a brazed joint having a remelt temperature in excess of the original brazing temperature. If an element, such as boron, is included in the braze alloy the melting temperature of the braze material may be depressed. Subsequent rapid diffusion of the boron into the substrate during the bonding operation effectively raises the remelt temperature of the joint although it does not provide a homogeneous diffusion-bonded joint. Representative of techniques of this nature is that described by Boam et al., U.S. Pat. No. 2,714,760.

In subsequent developments, others have investigated bonding systems wherein brazing and diffusion bonding process features have been combined. See, for example, an article by Davies et al in the *British Welding Journal*, Mar. 1962, entitled "Diffusion Bonding and Pressure Brazing of Nimonic 90 Nickel-Chromium-Cobalt Alloy." In these developments, the melting point depressant effect of boron, carbon or silicon together with their high diffusion rates have been utilized as interface materials in diffusion bonding processes, the interface material, in essence, assuring initial good surface contact for diffusion bonding through melting and flow in the early stage of the bonding sequence. Subsequent diffusion provides solid-state bonding.

While many of the braze alloy formulations utilized in these later developments have been of relatively simple chemistry and thus have not incorporated many of the strengthening mechanisms characterizing the superalloys, it has been reported that others have investigated combined brazing/diffusion bonding techniques utilizing interface alloys consisting of the base metal alloy to be bonded simply doped with a melting point depressant such as boron, etc., sufficient in quantity to provide melting at the desired temperature.

Although the art has thus suggested that a combined brazing/diffusion bonding process may be applied to various materials, application of the various techniques to the so-called rich superalloys is not as straightforward as the art might appear to suggest. As illustrative of the problem is the fact that while the various melting point depressants suggested in the art such as boron, silicon, manganese, columbium and titanium, do in fact provide interlayer alloys with satisfactory melting points, most are unusable with the nickelbase superalloys because of the production of deleterious phases during diffusion. In addition, problems such as lack of wettability, inability to control interlayer thickness, and severe base metal corrosion may be present.

SUMMARY OF THE INVENTION

A diffusion bonding process is described wherein a thin interlayer alloy of specific composition is placed between the surfaces to be bonded. The assembly with the surfaces held together is heated to the bonding temperature (above about 1930°F.) where the interlayer melts filling the gaps between the surfaces. While the assembly is held at temperature rapid interdiffusion occurs causing the joint to isothermally solidify, creating an initial bond. Further time at temperature or subsequent heat treatment is utilized to provide a diffusion bond and complete joint homogeneity and joint efficiencies of 95 percent or more.

The thin (typically 0.0005–0.005 inch) interlayer alloy is formulated to a chemistry substantially corresponding to that of the metal or metals to be joined except that aluminum, titanium and carbon are excluded, and sufficient boron up to about 5 weight percent is present to depress the melting point of the interlayer alloy to a temperature at which the metal substrate can be exposed without deleterious effect.

BRIEF DESCRIPTION OF THE DRAWINGS

In FIG. 1 the interlayer alloy containing readily diffusible species such as boron, illustrated by solid circles, is sandwiched between the surfaces to be joined.

FIG. 2 illustrates the assembly heated to the bonding temperature, the interlayer materials having melted and flowed to fill the gaps between the surfaces.

FIG. 3 illustrates diffusion of interlayer species into the surfaces to be joined and isothermal solidification of the interlayer alloy.

FIG. 4 shows continued exposure at temperature and the continuation of homogenization.

FIG. 5 depicts the completed joint.

FIG. 6 is a graphic reproduction of electron-probe microanalysis traces taken across an actual joint made as taught herein.

FIG. 7 demonstrates the results of 1,800° F. stress rupture tests indicating 95 percent joint efficiency for the present diffusion bonds made by the present technique in a nickel-base superalloy system.

DESCRIPTION OF THE PREFERRED EMBODIMENTS

Figure 1:
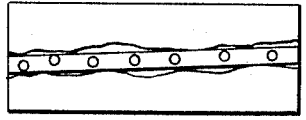
FIGS. 1–5 depict the bonding sequence utilized in the present invention.

The preferred process of this invention (hereinafter referred to as the TLP Bonding$_{TM}$ Process) contemplates initially electroplating the surfaces to be joined with a very thin layer (0.0001 inch) of nickel or a nickel-cobalt alloy. If proper surface protection is otherwise provided to prevent contamination of the faying surfaces, however, the initial electroplate may be eliminated. A thin (typically 0.0005–0.005 inch) interlayer alloy of specific composition, as hereinafter discussed in greater detail, is placed between the mating surfaces (as in FIG. 1) and the surfaces are held together. Only a slight positive pressure sufficient to hold the parts together (typically less than 10 p.s.i.) is required. Lesser interlayer thickness may be utilized if the surfaces are very closely matched.

Figure 2:
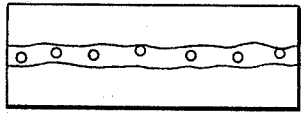
Figure 3:
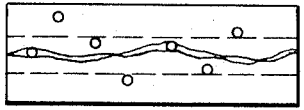
Figure 4:

The assembly is then heated in vacuum (usually $10^{-5}$ torr) to the desired bonding temperature above the solvus temperature of the $\gamma'$ phase in the nickel-base superalloy systems being bonded (typically in the range of 2,000–2,200° F.) or close to the $\gamma'$ solvus for the very rich alloys where $\gamma'$ solvus approaches the incipient melting point of the alloys and, in any event, above about 1,930° F. At this temperature the interlayer alloy melts and a thin layer of liquid wets and fills the gaps between the two mating surfaces (FIG. 2). While the assembly is held at temperature, rapid diffusion of certain alloying elements occurs between the interlayer and the base metal, resulting in a compositional change at the joint. This change raises the local melting point and causes the joint to isothermally solidify thus creating the initial bond (FIG. 3). Because the interlayer solidifies epitaxially and under dynamic equilibrium at the bonding temperature, it does not contain the difficult-to-eliminate multiple phase structure attendant with the nonequilibrium solidification characterizing fusion welding or conventional brazing. Instead upon completion of the initial isothermal solidification (typically in 1–3 hours), the joint microstructure resembles that of the base metal except for some compositional and structural heterogeneity (FIG. 4).

Ideally, the next step is continuation of the heat treatment at temperature for a time sufficient to completely homogenize the joint region so that, ultimately, it reaches a composition corresponding or at least closely equivalent to the base metal, although a separate and distinct subsequent heat treatment may be utilized. After completion of the bonding process, the bonded assembly can then be given whatever further heat treatments are required for strengthening or in fulfillment of coating requirements. Preferably, when possible, the times and temperatures utilized for homogenization of the joint area are selected to also correspond with the high temperature heat treatments specified for the alloy substrate.

It is evident that because minimal pressure is required during the joining operation, parts of complex geometry can be TLP bonded without deformation or other possible deleterious effect such as excessive base metal grain growth. Further, special tooling is not required since uniform high interfacial pressures are not necessary, and mating surface finish and fix-up requirements are also substantially relaxed. Finally, the TLP Bonding Process is suitable for the processing of large numbers of parts in conventional vacuum heat-treating furnaces.

The most critical features of the TLP Bonding Process are the composition and characteristics of the interlayer alloy. It must melt at a temperature at which the base metal can be exposed without deleterious effect but must be such that, in terms of composition and thickness, solidification will occur at temperature, and chemical and microstructural homogeneity may be achieved in a practical processing time.

Various melting point depressants such as boron, silicon, manganese, columbium and titanium have been evaluated. Several combinations of these elements produce interlayers with satisfactory melting points. However, with the rich nickel-base superalloys all except boron also produce unwanted stable phases at the joint interface. Consequently, only boron is utilized in the TLP Bonding Process. The boron content is controlled to obtain an optimum balance between melting point and ease of subsequent homogenization. In terms of overall interlayer alloy chemistry the alloy is otherwise formulated to closely conform in chemistry to the base metals being joined except that, because of unfavorable phase formulation problems, aluminum, titanium and carbon are excluded. These elements are, in fact, replenished in the interlayer region by diffusion from the base metal during homogenization. The exclusion of these elements also appears to provide good wettability to the substrate, a prerequisite for the attainment of sound homogeneous bonding.

EXAMPLE

A TLP bond was produced between two surfaces of a wrought nickel-base alloy of the following nominal composition, by weight, 15 percent chromium, 18.5 percent cobalt, 3.3 percent titanium, 4.3 percent aluminum, 5 percent molybdenum, 0.07 percent carbon, 0.03 percent boron, balance nickel (Alloy A).

The surfaces were first electroplated with a nickel flash to a thickness of 0.0001 inch. An interlayer alloy of the nominal composition, by weight, 15 percent chromium, 15 percent cobalt, 5 percent molybdenum, 3 percent boron, balance nickel, in the form of 0.003 inch sheet was sandwiched between the plated surfaces and the assembly was bonded in vacuum ($10^{-5}$ torr) at 2,140° F. for 1 hour under a dead weight pressure of about 8 p.s.i. Subsequently, the sample was homogenized by heat treatment in argon at 2,140° F. for 24 hours and then the assembly was given the standard aging heat treatment (1975° F./4 hrs. + 1550° F./4 hrs. + 1,400° F./16 hrs.).

Figure 5:
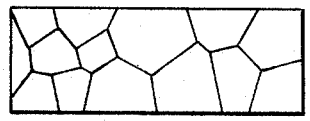

As may be seen from FIG. 5, electron probe microanalysis across the joint area revealed no compositional differences between the bond region and the base metal. Metallographic examination also revealed the joint area to be free of porosity and extraneous phases and revealed an interfacial grain boundary structure which is irregular and nonplanar.

Satisfactory bonds have also been made between two pieces of cast Alloy A utilizing the foregoing process parameters and interlayer alloy. Similarly, TLP bonds have been made between different nickel-base superalloys. In one test wrought Alloy A was joined to cast Alloy B having a nominal composition of, by weight, 14 percent chromium, 4.5 percent molybdenum, 2 percent columbium, 1 percent titanium, 6 percent aluminum, 0.01 percent boron, 0.08 percent zirconium, balance nickel. The same interlayer alloy used with wrought Alloy A was utilized and the sample was both bonded and homogenized at 2,140° F. which temperature corresponds to the solution heat treatment temperature for Alloy A.

From the foregoing description it will be evident that a relatively simple way has been discovered to make efficient diffusion bonds, particularly bonds characterized by substantially complete joint homogeneity and free of porosity and undesirable phases and microstructural defects. The invention in its broader aspects is not, however, limited to the specific details shown and described but departures may be made from such details without departing from the principles of the invention and without sacrificing its chief advantages.

What is claimed is:

1. A diffusion bonding process for the high strength nickel-base superalloys of the $\gamma$ - $\gamma'$ type which comprises:

providing an interlayer alloy having a composition substantially corresponding to that of the superalloys being joined, except as follows, aluminum, titanium and carbon are substantially excluded, and boron in an amount up to about 5 weight percent is present as a temperature depressant, the interlayer alloy having a melting point above about 1,930° F. and within the $\gamma'$ solvus temperature range of the superalloy;

sandwiching the interlayer alloy in a thickness of 0.0005–0.005 inch between the surfaces to be bonded with sufficient force to maintain the respective surfaces in intimate contact therewith;

heating the sandwich assembly to a temperature above the melting point of the interlayer alloy;

holding the assembly at temperature until isothermal solidification of the joint occurs by diffusion; and diffusion heat treating the assembly to provide homogenization of the joint area.

* * * * *